(12) United States Patent
Boenning et al.

(10) Patent No.: US 9,650,146 B2
(45) Date of Patent: May 16, 2017

(54) CONVERTIBLE CABIN ATTENDANT SEAT

(71) Applicant: Airbus Operations GmbH, Hamburg (DE)

(72) Inventors: Kenneth Boenning, Hamburg (DE); Marcus Gehm, Hamburg (DE); Jens Sorge, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 318 days.

(21) Appl. No.: 14/107,219

(22) Filed: Dec. 16, 2013

(65) Prior Publication Data

US 2014/0166808 A1 Jun. 19, 2014

Related U.S. Application Data

(60) Provisional application No. 61/737,121, filed on Dec. 14, 2012.

(30) Foreign Application Priority Data

Dec. 14, 2012 (EP) .................................... 12197218

(51) Int. Cl.
| | |
|---|---|
| *B64D 11/06* | (2006.01) |
| *B60N 2/30* | (2006.01) |
| *B60N 2/24* | (2006.01) |
| *B60N 2/34* | (2006.01) |

(52) U.S. Cl.
CPC ............ *B64D 11/0691* (2014.12); *B60N 2/24* (2013.01); *B60N 2/3002* (2013.01); *B60N 2/305* (2013.01); *B60N 2/3097* (2013.01); *B60N 2/34* (2013.01); *B64D 11/06* (2013.01); *B64D 11/0641* (2014.12); *B64D 11/0698* (2014.12)

(58) Field of Classification Search
CPC . B64D 11/06; B64D 11/0691; B64D 11/0643; B60N 2/3002; B60N 2/3097
USPC ....................................................... 244/118.6
See application file for complete search history.

(56) References Cited

U.S. PATENT DOCUMENTS

| | | | | |
|---|---|---|---|---|
| 3,594,037 | A | * | 7/1971 | Sherman .......................... 297/14 |
| 3,898,704 | A | * | 8/1975 | Gallaher .............. A47C 19/205 |
| | | | | 244/118.6 |
| 4,679,749 | A | * | 7/1987 | Ryan et al. ................ 244/122 R |

(Continued)

FOREIGN PATENT DOCUMENTS

| | | |
|---|---|---|
| CN | 1771149 | 5/2006 |
| DE | 3634839 | 4/1988 |

(Continued)

OTHER PUBLICATIONS

European Search Report, Jul. 2, 2013.
Chinese Office Action, Jun. 30, 2015.

*Primary Examiner* — Joseph W Sanderson
*Assistant Examiner* — Steven Hawk
(74) *Attorney, Agent, or Firm* — Greer, Burns & Crain, Ltd.

(57) ABSTRACT

A cabin attendant seat comprises a seat element and a backrest. The backrest is movable relative to the seat element between an upright position, wherein a backrest surface of the backrest extends at an angle of approximately 80 to 100° relative to a seat surface of the seat element, and a folded-back position, wherein the backrest surface of the backrest extends substantially co-planar with the seat surface of the seat element.

15 Claims, 5 Drawing Sheets

(56) References Cited

U.S. PATENT DOCUMENTS

| | | | |
|---|---|---|---|
| 4,740,030 A * | 4/1988 | Nordskog | 297/13 |
| 4,799,632 A * | 1/1989 | Baymak et al. | 244/122 R |
| 4,902,069 A * | 2/1990 | Lehnert | B64D 11/0691 297/14 |
| 4,993,666 A * | 2/1991 | Baymak et al. | 244/122 R |
| 5,180,120 A | 1/1993 | Simpson et al. | |
| 5,707,103 A * | 1/1998 | Balk | 297/13 |
| 6,227,489 B1 * | 5/2001 | Kitamoto et al. | 244/118.5 |
| 6,231,103 B1 * | 5/2001 | Elson et al. | 296/65.06 |
| 6,460,922 B1 * | 10/2002 | Demick | 297/14 |
| 7,201,349 B2 * | 4/2007 | Lavie et al. | 244/118.5 |
| 2005/0264058 A1 * | 12/2005 | Schumacher | A47C 1/023 297/232 |
| 2007/0057557 A1 * | 3/2007 | Moon | 297/354.13 |
| 2009/0206200 A1 * | 8/2009 | Bolder et al. | 244/118.5 |
| 2012/0199695 A1 * | 8/2012 | Isherwood et al. | 244/118.6 |
| 2013/0126671 A1 * | 5/2013 | Guering | B64D 11/06 244/118.6 |
| 2013/0126672 A1 * | 5/2013 | Weitzel et al. | 244/118.6 |
| 2013/0313365 A1 * | 11/2013 | Ehlers et al. | 244/118.6 |
| 2013/0334369 A1 * | 12/2013 | Schliwa et al. | 244/118.5 |
| 2014/0027572 A1 * | 1/2014 | Ehlers et al. | 244/118.6 |
| 2014/0048650 A1 * | 2/2014 | Schliwa et al. | 244/118.5 |
| 2014/0209741 A1 * | 7/2014 | Boenning et al. | 244/118.6 |
| 2014/0224931 A1 * | 8/2014 | Weitzel et al. | 244/118.6 |
| 2014/0312173 A1 * | 10/2014 | Ehlers et al. | 244/118.6 |
| 2014/0319275 A1 * | 10/2014 | Najd et al. | 244/118.6 |
| 2014/0326829 A1 * | 11/2014 | Ehlers et al. | 244/118.6 |
| 2014/0375086 A1 * | 12/2014 | Schliwa et al. | 297/14 |

FOREIGN PATENT DOCUMENTS

| | | |
|---|---|---|
| EP | 0170116 | 2/1986 |
| EP | 0957025 | 11/1999 |
| WO | 0206117 | 1/2002 |
| WO | 2004101310 | 11/2004 |
| WO | 2012080135 | 6/2012 |

* cited by examiner

CONVERTIBLE CABIN ATTENDANT SEAT

CROSS-REFERENCES TO RELATED APPLICATIONS

This application claims the benefit of the U.S. Provisional Application No. 61/737,121, filed on Dec. 14, 2012, and of the German patent application No. 12 197 218.6 filed on Dec. 14, 2012, the entire disclosures of which are incorporated herein by way of reference.

BACKGROUND OF THE INVENTION

The invention relates to a convertible cabin attendant seat. The invention further relates to an aircraft monument comprising a convertible cabin attendant seat.

The passenger cabin of a modern aircraft typically is equipped with cabin attendant seats which may either be mounted to a wall of a monument installed in the aircraft passenger cabin as described in non-published DE 10 2011 116 521 or be attached to the floor of the aircraft passenger cabin as known from DE 10 2008 009 938 A1.

Non-published DE 10 2011 116 521 further discloses a cabin attendant seat which is pivotably mounted to an aircraft monument, such that the cabin attendant seat can be pivoted relative to the aircraft monument from a stored position into an operating position. Single cabin attendant seats provide seating for one cabin attendant, whereas double cabin attendant seats as disclosed, e.g., in DE 3 634 839 A1 may be occupied by two cabin attendants in a side by side or a back to back alignment. For short and middle range aircraft, standard cabin attendant seats provide a basic comfort level which accounts for the short time of usage during taxi, take-off, landing and in-flight turbulence. For long range aircraft, high comfort cabin attendant seats are available which may additionally be used for rest periods during cruise.

In case of an inflight medical emergency which requires an ill or injured person to be treated in a lying posture, on single aisle aircraft, the standard procedure is to move the ill or injured person to a galley area of the aircraft cabin and to bed the ill or injured person on the cabin floor close to medical outlets provided in the galley area of the aircraft. Alternatively, especially in long range aircraft, two business class seats, which in normal operation are used as conventional seats, may be used as a medical area which is equipped with medical outlets and which, in case of a medical emergency, may be separated from the aircraft cabin by a curtain.

SUMMARY OF THE INVENTION

The invention is directed at the object of providing a cabin attendant seat which in case of an inflight medical emergency on board an aircraft improves the comfort and safety of an ill or injured person without requiring cabin space when not in use. The invention further is directed at the object of providing an aircraft monument which is equipped with a cabin attendant seat of this kind.

A cabin attendant seat according to the invention comprises a seat element and a backrest. The backrest is movable relative to the seat element between an upright position and a folded-back position. When the backrest is in its upright position, a backrest surface of the backrest extends at an angle of approximately 80 to 100° relative to a seat surface of the seat element. Preferably, the backrest surface of the backrest extends at an angle of approximately 90° relative to the seat surface of the seat element when the backrest is in its upright position. When the backrest is in its folded-back position, the backrest surface of the backrest extends substantially co-planar with the seat surface of the seat element.

When the backrest of the cabin attendant seat is in its upright position, the cabin attendant seat may be used like a conventional cabin attendant seat by crew members during taxi, take-off, landing and in-flight turbulence or during rest periods during cruise. In case of an inflight medical emergency, it is, however, possible to convert the cabin attendant seat to an emergency stretcher by moving the backrest into its folded-back position. Hence, an ill or injured person can be comfortably bedded on the emergency stretcher in a lying posture. As a result, it is no longer necessary to either bed an ill or injured person on the cabin floor or to move passengers occupying business class seats adapted for use as a medical area to other seats. Further, the emergency stretcher does not require additional cabin space when not in use.

The cabin attendant seat may further comprise a footrest which is movable relative to the seat element between a stowed position and an extended position. When the footrest is in its stowed position, the footrest preferably does not extend beyond a front edge of the seat element. As a result, when the footrest is in its stowed position, the footrest does not affect a person sitting on the cabin attendant seat. For example, the footrest in its stowed position may be disposed below the seat element or received in a suitable recess provided in the seat element of the cabin attendant seat. When the footrest is in its extended position, a supporting surface of the footrest preferably extends substantially co-planar with the seat surface of the seat element. When the cabin attendant seat is converted to an emergency stretcher with the backrest being in its folded-back position, the footrest thus can be used to support the feet of a person lying on the emergency stretcher. This allows further enhancing the comfort of a person lying on the emergency stretcher.

The footrest may comprise a first and a second portion. In the extend position of the footrest, the first portion may be disposed adjacent to the seat element and the second portion may be disposed adjacent to the first portion. Preferably, the first and the second portion of the footrest are movable relative to each other in a telescoping manner. A footrest comprising a first and a second portion may easily be stowed below the seat element or in a recess provided in the seat element such that the two portions of the footrest do not extend beyond the front edge of the seat element. Basically, it is conceivable for the first and the second portion of the footrest to have a similar or equal size. Preferably, however, the second portion of the footrest is smaller, i.e., has a smaller width than the first portion. This allows an ill or injured person to still be comfortably bedded on the cabin attendant seat converted to an emergency stretcher in a lying posture, but simultaneously minimizes the weight of the convertible cabin attendant seat.

The cabin attendant seat may comprise a first locking mechanism which is adapted to lock the backrest in either its upright position or its folded-back position. The first locking mechanism may be designed in the form of a latching mechanism and may be integrated into the seat element or the backrest of a cabin attendant seat. The first locking mechanism may be manually releasable. For example, a suitable releasing device may be provided, which may be pulled or pressed so as to release the first locking mechanism and hence to allow the backrest to be moved relative to the seat element between its upright position and its folded-back position.

In a preferred embodiment, the cabin attendant seat may comprise a first pivoting mechanism which allows the cabin attendant seat to be pivoted between a stowed position and an operating position. In its stowed position, the cabin attendant seat is positionable relative to an aircraft monument, such that the seat surface of the seat element faces a wall of the aircraft monument. When the cabin attendant seat is in its operating position, the cabin attendant seat is positionable relative to the aircraft monument such that the seat surface of the seat element extends substantially perpendicular to the wall of the aircraft monument. When the aircraft attendant seat is in its stowed position, the cabin attendant seat requires only a small volume of the cabin space, in particular since the seat element and the backrest are not stowed on top of each other like in existing cabin attendant seat solutions.

Basically, it is conceivable to stow the cabin attendant seat with the backrest in its folded-back position. When the cabin attendant seat is fastened to an aircraft monument and is disposed in its stowed position, the seat surface of the seat element and the backrest surface of the backrest then face the same wall of the aircraft monument. In a preferred embodiment of the cabin attendant seat, the backrest, however, is disposed in its upright position relative to the seat element, when the cabin attendant seat is disposed in its stowed position. When the cabin attendant seat is fastened to an aircraft monument, the cabin attendant seat then, in its stowed position, is positioned relative to the aircraft monument, such that the seat surface of the seat element faces a first wall of the aircraft monument and the backrest surface of the backrest faces a second wall of the aircraft monument, wherein the first and the second wall of the aircraft monument extend substantially perpendicular to each other. In other words, the cabin attendant seat may be mounted in a space saving manner to a corner area of the aircraft monument.

In the operating position of the cabin attendant seat, the seat surface of the seat element then extends substantially perpendicular to both the first and the second wall of the aircraft monument. The backrest surface of the backrest being disposed in its upright position, however, extends substantially perpendicular to the first wall and substantially co-planar with the second wall of the aircraft monument. When the backrest of the cabin attendant seat is disposed in its folded-back position, the backrest surface of the backrest, like the seat surface of the seat element, extends substantially perpendicular to both, the first and the second wall of the aircraft monument.

The cabin attendant seat may further comprise a biasing mechanism which is adapted to bias the cabin attendant seat into its stowed position. For example, the biasing mechanism may comprise a spring, in particular a torsion spring, which is adapted to automatically move the cabin attendant seat from its operating position into its stowed position. Preferably, the biasing force of the biasing mechanism is strong enough to retract the cabin attendant seat automatically after a cabin attendant, who has used the cabin attendant seat with the backrest of the cabin attendant seat in its upright position, has stood up, but low enough for an average person to move the cabin attendant seat into its operating position. The biasing mechanism ensures that the cabin attendant seat is automatically retracted into its stowed position when not in use so as to prevent the cabin attendant seat from blocking a main aisle, cross-aisle or passageway to an aircraft door.

The cabin attendant seat may further comprise a second locking mechanism which is adapted to lock the cabin attendant seat in its operating position. Like the first locking mechanism, the second locking mechanism may also be designed in the form of a latching mechanism.

The cabin attendant seat preferably further comprises an automatic activation device which is adapted to automatically activate the second locking mechanism when the cabin attendant seat is used with the backrest being disposed in its upright position, and which is adapted to automatically release the second locking mechanism when the cabin attendant seat is no longer occupied, wherein the backrest still is disposed in its upright position. In other words, due to the presence of the automatic activation device, the second locking mechanism preferably is self-unlocking when the cabin attendant seat is used with the backrest being disposed in its upright position, i.e., when the cabin attendant seat is used like a conventional cabin attendant seat. This design of the second locking mechanism ensures that the cabin attendant seat is automatically retraced into its stowed position after a cabin attendant sitting on the cabin attendant seat has stood up so as to prevent the cabin attendant seat from blocking a main aisle, cross-aisle or passageway to an aircraft door.

The cabin attendant seat, however, preferably further comprises a manually actuatable activation device which is adapted to manually activate the second locking mechanism when the cabin attendant seat is intended to be used with the backrest being disposed in its folded-back position. For example, the manually actuatable activating device may be designed in the form of a switch which may be pressed so as to activate the second locking mechanism when the cabin attendant seat is converted to an emergency stretcher. Preferably, however, the manually actuatable activating device is adapted to only activate the second locking mechanism, when the backrest of the cabin attendant seat in fact is disposed in its folded-back position. The manually actuatable activation device may further be adapted to release the second locking mechanism when the manually actuatable activation device is actuated when the second locking mechanism is locked.

The cabin attendant seat may further comprise a first restraint system which is adapted to restrain a user using the cabin attendant seat with the backrest being disposed in its upright position. For example, the first restraint system may be designed in the form of a four point restraint system which might be integrated in at least one of the seat element and the backrest. Preferably, the first restraint system comprises a lap belt which may be stowed in a suitable receptacle provided in the seat element or the backrest when not in use. Further, the first restraint system may comprise a shoulder harness, which may be stowed in a suitable receptacle provided in the backrest.

The automatic activation device for automatically activating and releasing the second locking mechanism may be coupled to the first restraint system. For example, the automatic activation device may be adapted to automatically activate the second locking mechanism so as to lock the cabin attendant seat in its operating position, when the backrest of the cabin attendant seat is disposed in its upright position and a user pulls the first restraint system out of its stowage. In addition, the automatic activation device may be adapted to automatically release the second locking mechanism so as to allow the cabin attendant seat to pivot from its operating position into its stowed position due to the biasing force of the biasing mechanism, when the backrest of the cabin attendant seat is in its upright position, the first restraint system is opened and/or stowed and the cabin attendant has stood up, i.e., removed his/her body weight from the seat.

The cabin attendant seat may further be provided with a second restraint system which is adapted to restrain a user using the cabin attendant seat with the backrest being disposed in its folded-back position. In particular, the second restraint system may designed in the form of five point restraint system and may be adapted to restrain a person in a lying posture when the cabin attendant seat is converted to an emergency stretcher. The second restraint system may comprise the lap belt and the shoulder harness of the first restraint system together with an additional belt extending between the legs of a person lying on the emergency stretcher. The additional belt of the second restraint system may be stowed in a suitable receptacle provided in the seat element. An ill or injured person thus may be restrained on the cabin attendant seat converted to an emergency stretcher in a lying posture such that it is not necessary to move the ill or injured person to a conventional seat in case of turbulence and for landing.

The cabin attendant seat may further comprise a headrest which preferably is formed integral with the backrest. When converted to an emergency stretcher, the cabin attendant seat then has a length allowing an ill or injured person to be bedded on the cabin attendant seat in a particularly comfortable manner. Simultaneously, the cabin attendant seat fulfills all safety requirements for use as a cabin attendant seat with the backrest being disposed in its upright position.

The cabin attendant seat may further comprise a support panel which may be attached to a rear surface of the backrest. The support panel may be pivotable relative to the backrest between a stowed position and a support position. When the support panel is in its stowed position, the support panel may extend substantially parallel to the backrest. For example, the support panel, in its stowed position, may at least partially be received within a suitably sized recess formed in the rear surface of the backrest. When the support panel is disposed in its support position, the support panel may extend substantially perpendicular to the backrest so as to form a supporting base for the backrest when the backrest is disposed in its folded-back position. Preferably, the support panel is dimensioned so as to extend to a floor of the aircraft cabin when the backrest is disposed in its folded-back position. The support panel helps to stabilize the cabin attendant seat when it is converted to an emergency stretcher, in particular when a person is lying on the emergency stretcher.

The cabin attendant seat may comprise a further seat element which is movable relative to the backrest between a folded position and an unfolded position. When the further seat element is in its folded position, a seat surface of the further seat element preferably extends substantially parallel to and faces the rear surface of the backrest. When the further seat element is in its unfolded position, the seat surface of the further seat element preferably extends substantially perpendicular to the rear surface of the backrest. A cabin attendant seat comprising a further seat element may be occupied by two cabin attendants in a back to back alignment.

With the further seat element being disposed in its folded position, the cabin attendant seat has a particularly low space requirement. The cabin attendant seat may comprise a suitable further biasing mechanism for biasing the further seat element into its folded position. Preferably, the biasing force of the further biasing mechanism is strong enough to retract the further seat element automatically after a cabin attendant has stood up, but low enough for an average person to dispose the further seat element into the unfolded position using one hand and sitting down at the same time. Moreover, a further locking mechanism may be provided which is adapted to lock the further seat element in its unfolded position against the biasing force of the further biasing mechanism. For safety reasons, such a further locking mechanism, however, must be self-unlocking after the cabin attendant has stood up, such that the further seat element is automatically retracted into its folded position so as to prevent the further seat element from blocking a main aisle, cross-aisle or passageway to an aircraft door.

Further, the automatic activation device for automatically activating and releasing the second locking mechanism may be coupled to the further seat element. For example, the automatic activation device may be adapted to automatically activate the second locking mechanism so as to lock the cabin attendant seat in its operating position, when the further seat element is in its unfolded position. Further, the automatic activation device may be adapted to automatically release the second locking mechanism so as to allow the cabin attendant seat to pivot from its operating position into its stowed position due to the biasing force of the biasing mechanism, when the further seat element has moved into its folded position.

An aircraft monument according to the invention comprises a first wall and an above described cabin attendant seat which is attached to the first wall of the aircraft monument. The aircraft monument may be any suitable monument which is intended for installation in an aircraft cabin such as for example an aircraft galley, a lavatory module or the like. The cabin attendant seat thus can be installed close to a main aisle of an aircraft cabin in a single aisle aircraft or close to one of the aisles in a twin aisle aircraft which increase visibility of the aisle and the passenger seats. The cabin attendant seat thus provides direct view of almost the entire cabin.

Preferably, the cabin attendant seat is fastened to the first wall of the aircraft monument in a load transmitting manner. Typically, a cabin attendant seat has to fulfill certain load bearing requirements, i.e., the cabin attendant seat must be capable of withstanding certain static and dynamic loads. Therefore, prior art cabin attendant seats usually are provided with a support structure which is mounted to the floor of the aircraft cabin and which is capable of directing loads applied onto the cabin attendant seat into the aircraft structure. When the cabin attendant seat is fastened to the first wall of the aircraft monument in a load transmitting manner, the aircraft monument may be used to direct loads applied onto the cabin attendant seat into the aircraft structure. In other words, the aircraft monument may serve at least as an additional support structure for the cabin attendant seat allowing the support structure of the cabin attendant seat to be designed less strong and hence more lightweight.

The aircraft monument may further comprise a second wall which extends substantially perpendicular to the first wall. When the cabin attendant seat is in its stowed position, the cabin attendant seat may be positioned relative to the aircraft monument such that the seat surface of the seat element faces the first wall of the aircraft monument and the backrest surface of the backrest faces the second wall of the aircraft monument. In other words, the cabin attendant seat, in its stowed position, may be disposed in a corner region of the aircraft monument. When the cabin attendant seat is in its operating position, the cabin attendant seat may be positioned relative to the aircraft monument such that the seat surface of the seat element extends substantially perpendicular to both, the first and the second wall of the aircraft monument. The backrest surface of the backrest being disposed in its upright position, however, extends substantially perpendicular to the first wall and substantially co-planar with the second wall of the aircraft monument. When the backrest of the cabin attendant seat is disposed in its folded-back position, the backrest surface of the backrest, like the seat surface of the seat element, extends substantially perpendicular to both, the first and the second wall of the aircraft monument The aircraft monument may further comprise a stowage box which, for example, may be adapted to store emergency equipment and/or medical equipment. The stowage box may be fastened to the first wall of the aircraft monument. Preferably, the stowage box is fastened to the first wall of the aircraft monument in a load transmitting manner such that loads applied onto the stowage box are directed into the aircraft structure via the first wall of the aircraft monument. The stowage box may be fastened to the first wall of the aircraft monument in such a position that the seat element of the cabin attendant seat is supported by the stowage box when the cabin attendant seat is disposed in its operating position. The stowage box thus serves to stabilize the cabin attendant seat in its operating position allowing the support structure of the cabin attendant seat to be designed less strong and hence more lightweight.

A recess may be formed in the first wall of the aircraft monument. The recess may be adapted to at least partially receive the seat element of the cabin attendant seat when the cabin attendant seat is disposed in its stowed position. Further, the recess may be adapted to at least partially receive and the stowage box fastened to the first wall of the aircraft monument. Preferably, the seat element of the cabin attendant seat being disposed in its stowed position and the stowage box are embedded in the recess formed in the first wall of the aircraft monument in such a manner that a lower surface of the seat element and a front surface of the stowage box are in level with the first wall of the aircraft monument. An aircraft monument comprising a first wall provided with a recess allows the cabin attendant seat to be stowed in a particularly space saving manner.

The aircraft monument may further comprise a medical panel comprising at least one medical outlet. The medical panel, for example, may be attached to the first wall of the aircraft monument in such a position that the seat element of the cabin attendant seat extends below the medical panel when the cabin attendant seat is disposed in its operating position. The medical panel then is easily accessible, in particular when the cabin attendant seat is converted to an emergency stretcher. Alternatively, the medical panel may also be attached to the second wall of the aircraft monument.

Finally, the aircraft monument may comprise a curtain arrangement comprising a curtain rail and a curtain. The curtain rail may be fastenable to the first wall of the aircraft monument so as to extend substantially perpendicular to the first wall. The curtain may be fastenable to the curtain rail so as to also extend substantially perpendicular to the first wall of the aircraft monument. The curtain arrangement may be used to separate the aircraft cabin area wherein the cabin attendant seat is installed from the rest of the aircraft cabin when the cabin attendant seat is converted to an emergency stretcher.

BRIEF DESCRIPTION OF THE DRAWINGS

Preferred embodiments of the invention now are described in greater detail with reference to the appended schematic drawings, wherein.

DETAILED DESCRIPTION OF THE PREFERRED EMBODIMENTS

Figure 1:
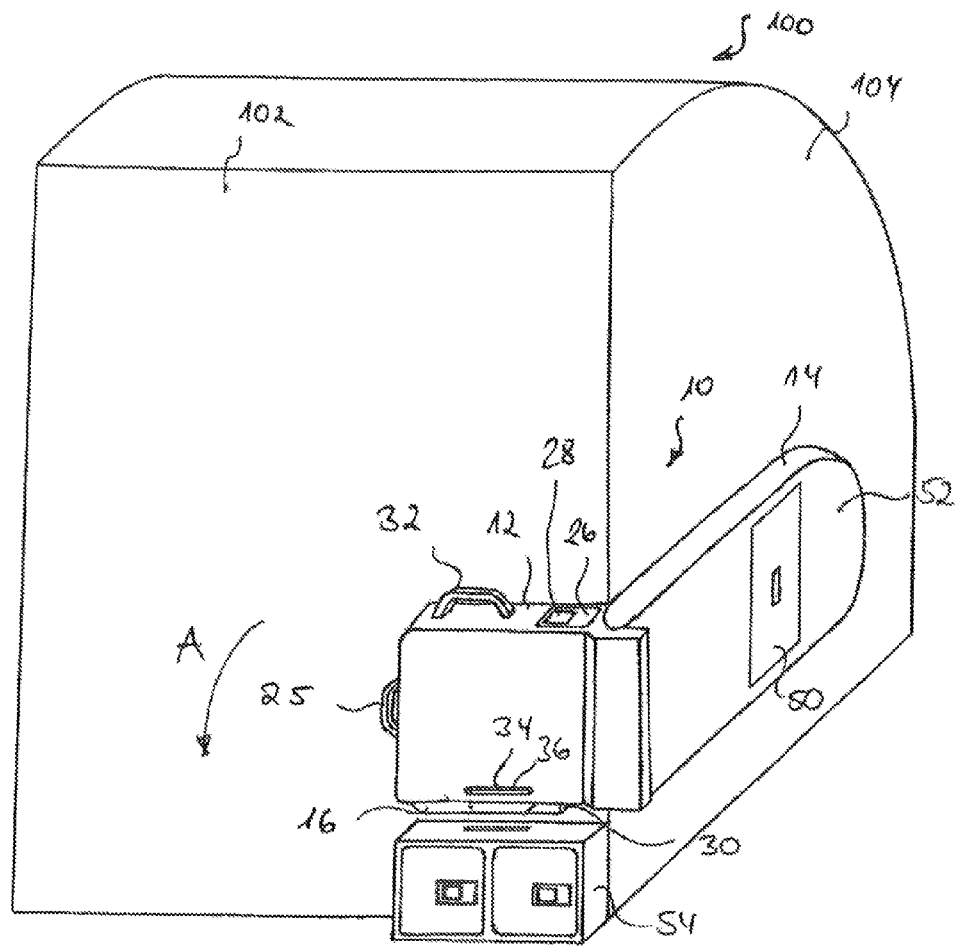
FIG. 1 shows a first embodiment of an aircraft monument with a convertible cabin attendant seat being fastened to a first wall of the aircraft monument, wherein the convertible cabin attendant seat is disposed in a stowed position.
Figure 2:
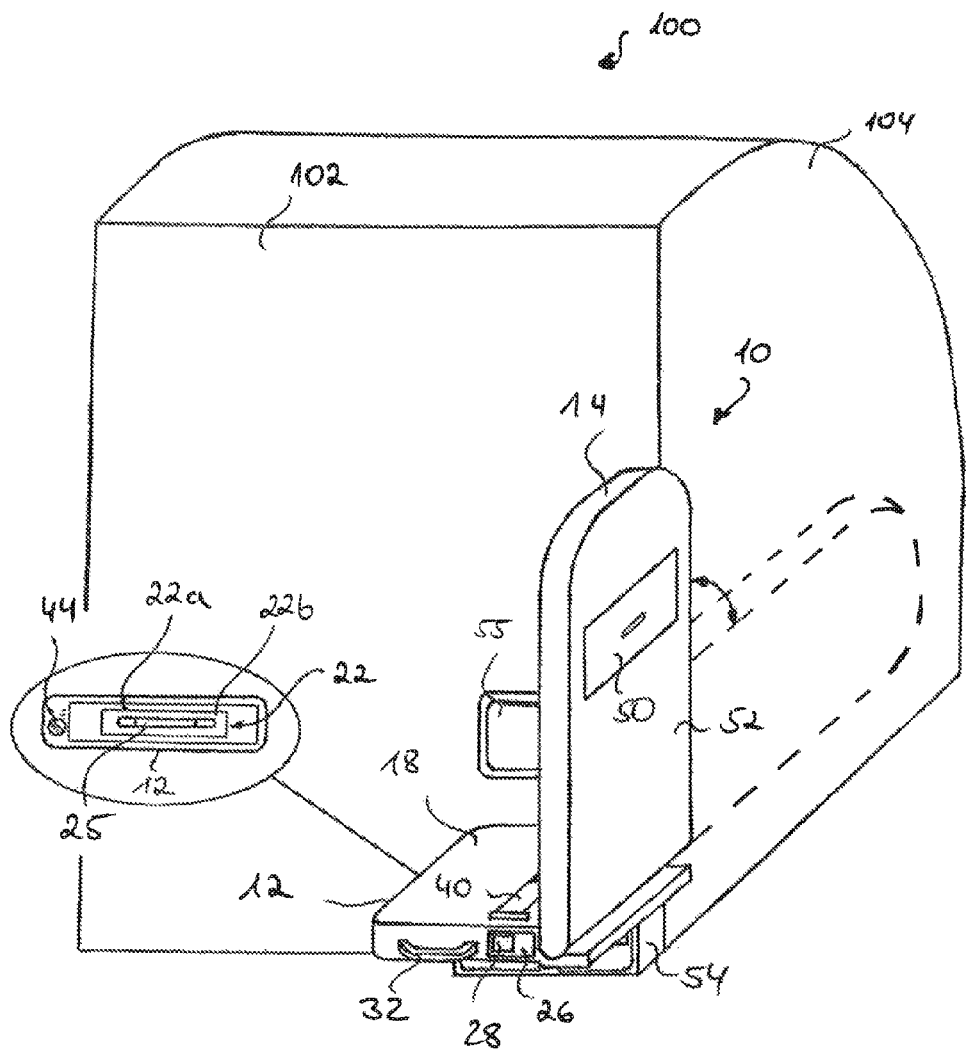
FIG. 2 shows the aircraft monument according to FIG. 1, wherein the convertible cabin attendant seat is disposed in its operating position with a backrest of the cabin attendant seat being disposed in an upright position.
Figure 3:
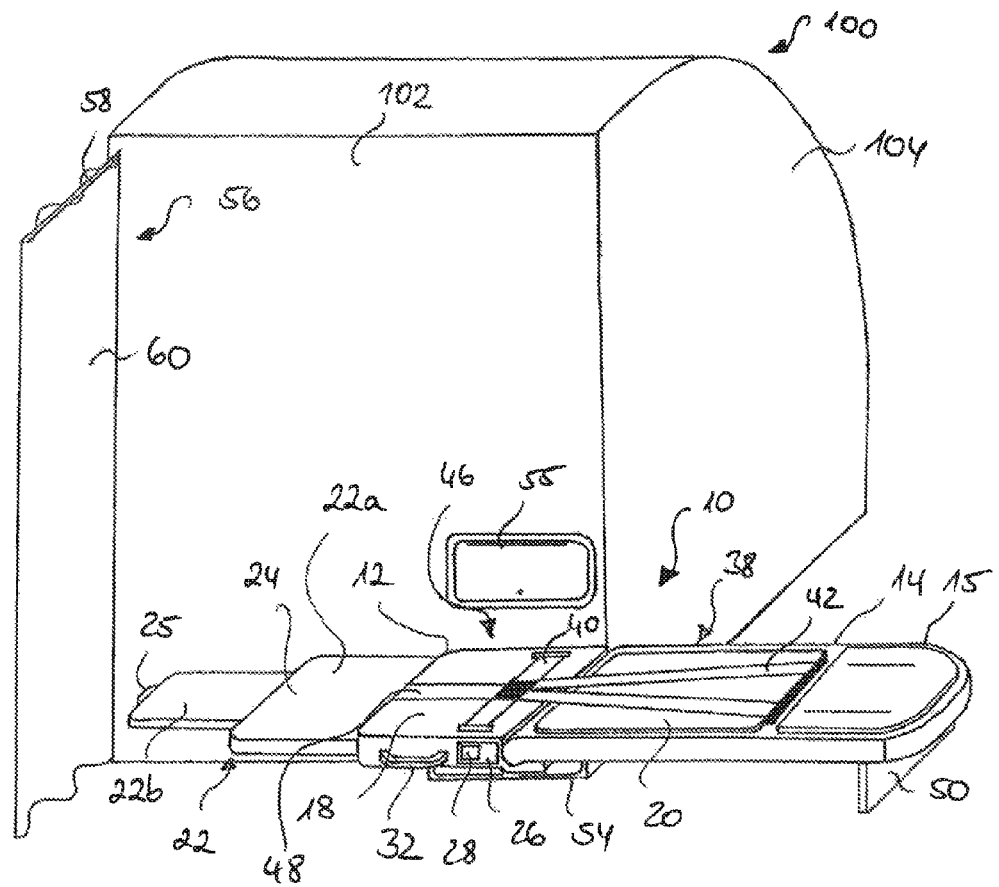
FIG. 3 shows the aircraft monument according to FIG. 2, wherein the cabin attendant seat is converted to an emergency stretcher by moving the backrest of the cabin attendant seat into a folded-back position.

FIGS. 1 to 3 show a first embodiment of an aircraft monument 100. The aircraft monument 100 comprises a first wall 102 and a second wall 104. The second wall 104 extends substantially perpendicular to the first wall 102. The aircraft monument 100 may be any monument which is intended for installation in an aircraft cabin. For example, the aircraft monument 100 may be designed in the form of a galley or a lavatory module. A convertible cabin attendant seat 10 is fastened to the first wall 102 of the aircraft monument 100 in a load transmitting manner. Specifically, the cabin attendant seat 10 is fastened to the first wall 102 of the aircraft monument 10 in a manner which allows loads applied to the cabin attendant seat 10 to be directed into an aircraft structure via the first wall 102 of the aircraft monument 100.

The cabin attendant seat 10 comprises a seat element 12 and a backrest 14 with an integrated headrest 15. A first pivoting mechanism 16 of the cabin attendant seat 10 allows the cabin attendant seat 10 to be pivoted between a stowed position, see FIG. 1, and an operating position, see FIG. 2. When the cabin attendant seat 10 is in its stowed position as shown in FIG. 1, a seat surface 18 of the seat element 12 extends substantially parallel to and faces the first wall 102 of the aircraft monument 100. A backrest surface 20 of the backrest 14 extends substantially parallel to and faces the second wall 104 of the aircraft monument. In other words, when the cabin attendant seat is in its stowed position, the cabin attendant seat 10 is disposed in a corner region of the aircraft monument 100. When the cabin attendant seat 10 is disposed in its operating position as shown in FIG. 2, the seat surface 18 of the seat element 12 extends substantially perpendicular to both, the first and the second wall 102, 104 of the aircraft monument 100. The backrest surface 20 of the backrest 14 extends substantially perpendicular to the first wall 102 and substantially co-planar with the second wall 104 of the aircraft monument 100.

As becomes apparent from a comparison of FIGS. 2 and 3, the backrest 14 of the cabin attendant seat 10 is movable relative to the seat element 14 between an upright position, see FIG. 2, and a folded-back position, see FIG. 3. When the backrest 14 is in its upright position, the backrest surface 20 extends at an angle of approximately 90° relative to the seat surface 18 of the seat element 12. The cabin attendant seat 10 then may be used like a conventional cabin attendant seat by crew members during taxi, take-off, landing and in-flight turbulence or during rest periods during cruise. When, however, the backrest 14 is in its folded-back position, the backrest surface 20 of the backrest 14 extends substantially co-planar with the seat surface 18 of the seat element 12. By moving the backrest 14 from its upright position into its folded-back position, the cabin attendant seat 10 may be converted to an emergency stretcher which in case of an inflight medical emergency may be used to bed an ill or injured person in a lying posture.

The cabin attendant seat 10 further comprises a footrest 22 which is movable relative to the seat element 12 between a stowed position and an extended position. In its stowed position, the footrest 22 is received in a suitable recess provided in the seat element 12 and thus does not extend beyond a front edge of the seat element 12 (see detail in FIG. 2). As a result, when the footrest 22 is in its stowed position, the footrest 22 does not affect a person sitting on the cabin attendant seat 10. When the footrest 22 is in its extended position as shown in FIG. 3, a supporting surface 24 of the footrest 22 preferably extends substantially co-planar with the seat surface 18 of the seat element 12, allowing the footrest 22 to be used for supporting the feet of a person lying on the emergency stretcher. The footrest 22 comprises a first and a second portion 22a, 22b. In the extend position of the footrest 22, the first portion 22a is disposed adjacent to the seat element 12 and the second portion 22b is disposed adjacent to the first portion 22a. The first and the second portion 22a, 22b of the footrest 22 are movable relative to each other in a telescoping manner. Further, the second portion 22b of the footrest 22 is smaller, i.e., has a smaller width than the first portion 22a. The footrest 22 may be moved into its extended position by pulling a grab handle 25.

The cabin attendant seat 10 further comprise a first locking mechanism 26 which is adapted to lock the backrest 14 in either its upright position or its folded-back position. The first locking mechanism 26 is designed in the form of a manually releasable latching mechanism and is integrated into the seat element 12. By manually actuating a releasing device 28 of the first locking mechanism 26, the first locking mechanism 26 may be released, allow the backrest 14 to be moved relative to the seat element 12 between its upright position and its folded-back position.

The cabin attendant seat 10 further comprises a biasing mechanism 30 which is adapted to bias the cabin attendant seat 10 into its stowed position. Specifically, the biasing mechanism 30 comprises a spring, in particular a torsion spring, which is adapted to automatically move the cabin attendant seat 10 from its operating position into its stowed position. The biasing force of the biasing mechanism 30 is strong enough to retract the cabin attendant seat 10 automatically after a cabin attendant, who has used the cabin attendant seat 10 with the backrest 14 of the cabin attendant seat 10 in its upright position, has stood up, but low enough for an average person to move the cabin attendant seat 10 into its operating position. A further grab handle 32 is provided on the seat element 12 of the cabin attendant seat 10. A user who wishes to move the cabin attendant seat 10 from its stowed position into its operation position may grab the further grab handle 32 and pull the cabin attendant seat in the direction of an arrow A, see FIG. 1.

A second locking mechanism 34 serves to lock the cabin attendant seat 10 in its operating position. Like the first locking mechanism 26, the second locking mechanism 34 also is designed in the form of a latching mechanism. The cabin attendant seat 10 further comprises an automatic activation device 36 which is adapted to automatically activate the second locking mechanism 34 when the cabin attendant seat 10 is used with the backrest 14 being disposed in its upright position, and which is adapted to automatically release the second locking mechanism 34 when the cabin attendant seat 10 is no longer occupied, wherein the backrest 14 still is disposed in its upright position. Due to the presence of the automatic activation device 36, the second locking mechanism 34 is self-unlocking when the cabin attendant seat 10 is used with the backrest 14 being disposed in its upright position, i.e., when the cabin attendant seat 10 is used like a conventional cabin attendant seat.

The automatic activation device 36 for automatically activating and releasing the second locking mechanism 34 is coupled to a first restraint system 38. The first restraint system 38 is adapted to restrain a user using the cabin attendant seat 10 with the backrest 14 being disposed in its upright position and comprises a lap belt 40 and a shoulder harness 42. When not in use, the lap belt 40 may be stowed in a suitable receptacle provided in the seat element 12 and the shoulder harness 42 may be stowed in a suitable receptacle provided in the backrest 14.

The automatic activation device 36 for automatically activating and releasing the second locking mechanism 34 is adapted to automatically activate the second locking mechanism 34 so as to lock the cabin attendant seat 10 in its operating position, when the backrest 14 of the cabin attendant seat 10 is disposed in its upright position and a user pulls the first restraint system 38 out of its stowage. In addition, the automatic activation device 36 is adapted to automatically release the second locking mechanism 34 so as to allow the cabin attendant seat 10 to pivot from its operating position into its stowed position due to the biasing force of the biasing mechanism 30, when the backrest 14 of the cabin attendant seat 10 is in its upright position and the first restraint system 38 is opened and/or stowed.

The cabin attendant seat 10 further comprises a manually actuatable activation device 44 which is disposed in the region of a front surface of the seat element 12 (see detail in FIG. 2) and which adapted to manually activate the second locking mechanism 34 when the cabin attendant seat 10 is intended to be used with the backrest 14 being disposed in its folded-back position, i.e., is intended to be used in an emergency stretcher mode. Specifically, the manually actuatable activating device 44 is designed in the form of a switch which may be pressed so as to activate the second locking mechanism 34 when the cabin attendant seat 10 is converted to an emergency stretcher as shown in FIG. 3. However, the manually actuatable activating device 44 is designed to activate the second locking mechanism 34 only when the backrest 14 of the cabin attendant seat 10 in fact is disposed in its folded-back position. When the second locking mechanism 34 is locked, the second locking mechanism 34 may be released by again manually actuating the manually actuatable activation device 44. In summary, the manually actuatable activation device 44 allows to select whether the cabin attendant seat 10 is either manually locking (when the cabin attendant seat 10 is used in the emergency stretcher mode) or automatically locking and unlocking (when the cabin attendant seat 10 is used like a conventional cabin attendant seat).

As becomes apparent from FIG. 3, the cabin attendant seat 10 further is provided with a second restraint system 46 which is adapted to restrain a user using the cabin attendant seat 10 with the backrest 14 being disposed in its folded-back position. The second restraint system 46 comprises the lap belt 40 and the shoulder harness 42 of the first restraint system 38 together with an additional belt 48 extending between the legs of a person lying on the emergency stretcher. When not in use, the additional belt 48 of the second restraint system 46 is stowed in a suitable receptacle provided in the seat element 12.

The cabin attendant seat 10 further comprises a support panel 50 which is attached to a rear surface 52 of the backrest 14. The support panel 50 is pivotable relative to the backrest 14 between a stowed position, see FIGS. 1 and 2, and a support position, see FIG. 3. When the support panel 50 is in its stowed position, the support panel 50 extends substantially parallel to the backrest 14. When the support panel 50 is disposed in its support position, the support panel 50 extends substantially perpendicular to the backrest 14 so as to form a supporting base for the backrest 14 when the backrest 14 is disposed in its folded-back position. In particular, the support panel 50 is dimensioned so as to extend to a floor of the aircraft cabin when the backrest 14 is disposed in its folded-back position.

The aircraft monument 100 further comprises a stowage box 54 which is adapted to store emergency equipment and/or medical equipment. The stowage box 54 is fastened to the first wall 102 of the aircraft monument 100 in a load transmitting manner such that loads applied onto the stowage box 54 are directed into the aircraft structure via the first wall 102 of the aircraft monument 100. In particular, the stowage box 54 is fastened to the first wall 102 of the aircraft monument 100 in such a position that the seat element 12 of the cabin attendant seat 10 is supported by the stowage box 54 when the cabin attendant seat 10 is disposed in its operating position according to FIGS. 2 and 3.

The aircraft monument 100 further comprises a medical panel 55 comprising at least one medical outlet. The medical panel 55 is attached to the first wall 102 of the aircraft monument 100 in such a position that the seat element 12 of the cabin attendant seat 10 extends below the medical panel 55 when the cabin attendant seat 10 is disposed in its operating position according to FIGS. 2 and 3.

Finally, the aircraft monument 100 comprises a curtain arrangement 56 comprising a curtain rail 58 and a curtain 60. The curtain rail 58 is fastenable to the first wall 102 of the aircraft monument 100 so as to extend substantially perpendicular to the first wall 102. The curtain 60 is fastenable to the curtain rail 58 so as to also extend substantially perpendicular to the first wall 102 of the aircraft monument 100.

Figure 4:
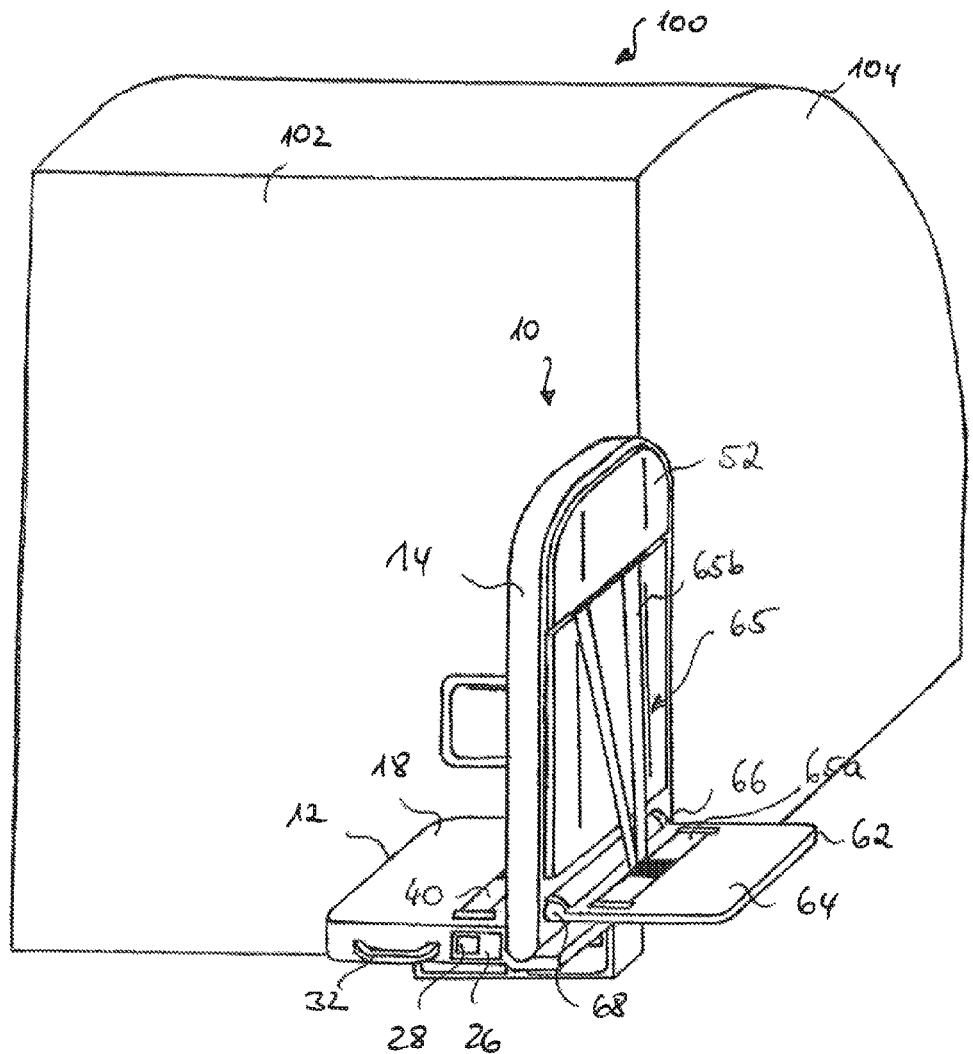
FIG. 4 shows a further embodiment of an aircraft monument with a convertible cabin attendant seat being fastened to a first wall of the aircraft monument, wherein the convertible cabin attendant seat is disposed in its operating position with a backrest of the cabin attendant seat being disposed in an upright position.

In a further embodiment of an aircraft monument 100, which is shown in FIG. 4, the cabin attendant seat 10 is not provided with a support panel 50, but comprises a further seat element 62 which is movable relative to the backrest 14 of the cabin attendant seat 10 between a folded position and an unfolded position. When the further seat element 62 is in its folded position, a seat surface 64 of the further seat element 62 extends substantially parallel to and faces the rear surface 52 of the backrest 14. When the further seat element 62 is in its unfolded position, the seat surface 64 of the further seat element 62 extends substantially perpendicular to the rear surface 52 of the backrest 14. A further restraint system 65 comprises a lap belt 65a and a shoulder harness 65b and serves to restrain a person sitting on the further seat element 62.

The cabin attendant seat 10 according to FIG. 4 comprises a further biasing mechanism 66 for biasing the further seat element 62 into its folded position. The biasing force of the further biasing mechanism 66 is strong enough to retract the further seat element 62 automatically after a cabin attendant has stood up, but low enough for an average person to dispose the further seat element 62 into the unfolded position using one hand and sitting down at the same time. Moreover, a further locking mechanism 68 is provided which is adapted to lock the further seat element 62 in its unfolded position against the biasing force of the further biasing mechanism 66. For safety reasons, the further locking mechanism 68 is self-unlocking after the cabin attendant has stood up, such that the further seat element 62 is automatically retracted into its folded position so as to prevent the further seat element 62 from blocking a passageway to a door.

Further, the automatic activation device 36 for automatically activating and releasing the second locking mechanism 34 is coupled to the further seat element 62. Hence, the second locking mechanism 34 is automatically activated by the automatic activation device 36 so as to lock the cabin attendant seat 10 in its operating position, when the further seat element 62 is in its unfolded position. Further, the automatic activation device 36 is adapted to automatically release the second locking mechanism 34 so as to allow the cabin attendant seat 10 to pivot from its operating position into its stowed position due to the biasing force of the biasing mechanism 30, when the further seat element 62 has moved into its folded position.

Otherwise the structure and the function of the aircraft monument 100 according to FIG. 4 correspond to the structure and the function of the aircraft monument 100 as shown in FIGS. 1 to 3.

Figure 5:
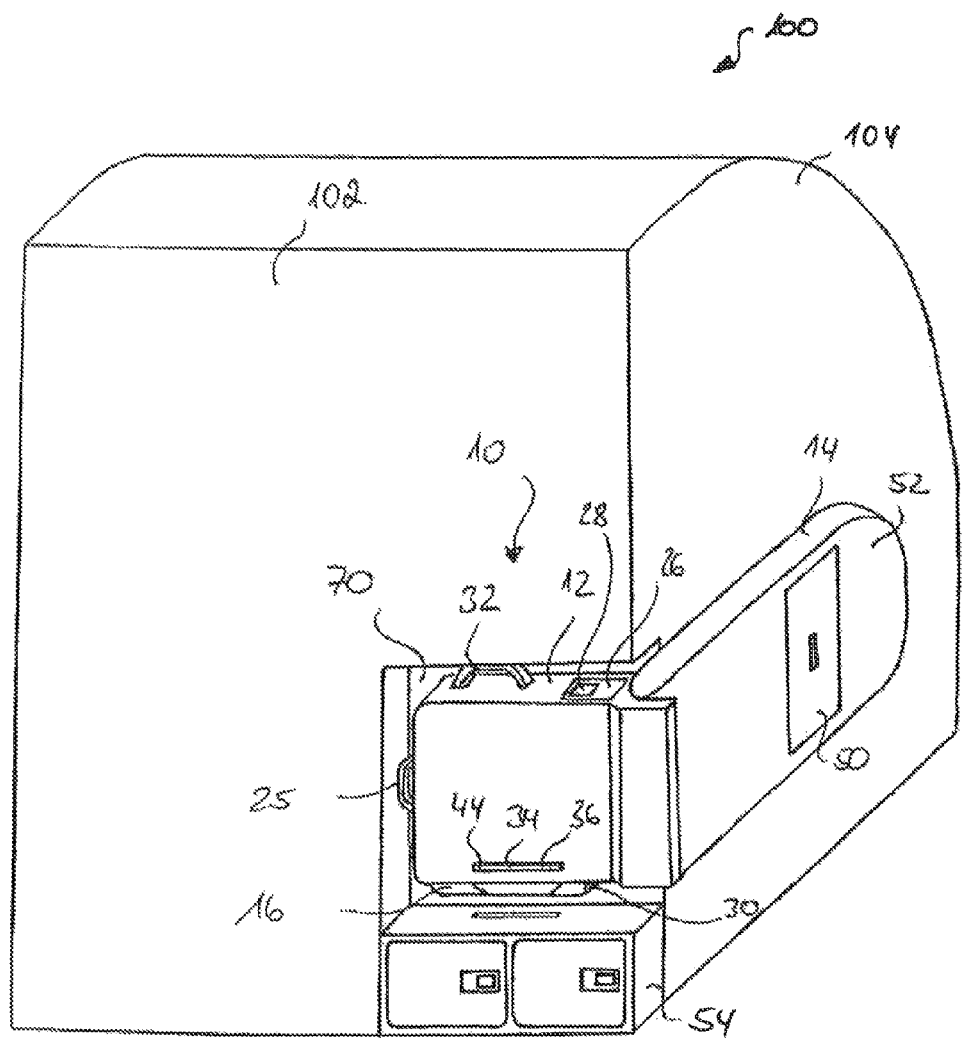
FIG. 5 shows a further embodiment of an aircraft monument with a convertible cabin attendant seat being fastened to a first wall of the aircraft monument, wherein the convertible cabin attendant seat is disposed in a stowed position.

In a further embodiment of an aircraft monument 100, which is shown in FIG. 5, a recess 70 is formed in the first wall 102 of the aircraft monument 100. The recess 70 is formed and dimensioned such that the seat element 12 of the cabin attendant seat 10 being disposed in its stowed position and the stowage box 54 are embedded in the recess 70 in such a manner that a lower surface of the seat element 12 and a front surface of the stowage box 54 are in level with the first wall 102 of the aircraft monument 100.

Otherwise the structure and the function of the aircraft monument 100 according to FIG. 5 correspond to the structure and the function of the aircraft monument 100 as shown in FIGS. 1 to 3.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A cabin attendant seat comprising:
   a seat element,
   a backrest, said backrest being movable relative to the seat element between an upright position, wherein a backrest surface of the backrest extends at an angle of approximately 80 to 100° relative to a seat surface of the seat element, and a folded-back position, wherein the backrest surface of the backrest extends substantially co-planar with the seat surface of the seat element, and
   a first pivoting mechanism allowing the cabin attendant seat to be pivoted between a stowed position and an operating position, wherein the cabin attendant seat is positionable relative to an aircraft monument into the stowed position by pivoting the seat element via the first pivoting mechanism such that the seat surface of the seat element faces a first wall of the aircraft monument and the backrest surface of the backrest faces a second wall of the aircraft monument, the second wall extending substantially perpendicular to the first wall, and wherein the cabin attendant seat is positionable relative to the aircraft monument into the operating position by pivoting the seat element via the first pivoting mechanism such that the seat surface of the seat element extends substantially perpendicular to both the first and the second wall of the aircraft monument and the backrest surface of the backrest is in the upright position.

2. The cabin attendant seat according to claim 1, further comprising a footrest which is movable relative to the seat element between a stowed position, wherein the footrest does not extend beyond a front edge of the seat element and an extended position, wherein a supporting surface of the footrest extends substantially co-planar with the seat surface of the seat element.

3. The cabin attendant seat according to claim 2, wherein the footrest comprises a first portion which, in the extended position of the footrest, is disposed adjacent to the seat element and a second portion which, in the extended position of the footrest, is disposed adjacent to the first portion, the first and the second portion of the footrest being movable relative to each other in a telescoping manner.

4. The cabin attendant seat according to claim 1, further comprising a first locking mechanism which is adapted to lock the backrest in either its upright position or its folded-back position.

5. The cabin attendant seat according to claim 1, wherein, in the stowed position of the cabin attendant seat, the backrest is disposed in its upright position relative to the seat element.

6. The cabin attendant seat according to claim 1, further comprising at least one of:
a biasing mechanism which is adapted to bias the cabin attendant seat in its stowed position,
a second locking mechanism which is adapted to lock the cabin attendant seat in its operating position, and
a manually acuatable activating device which is adapted to manually activate the second locking mechanism when the cabin attendant seat is intended to be used with the backrest being disposed in its folded-back position.

7. The cabin attendant seat according to claim 1, further comprising at least one of:
a headrest formed integral with the backrest, and
a support panel which is attached to a rear surface of the backrest and which is pivotable relative to the backrest between a stowed position, wherein the support panel extends substantially parallel to the backrest, and a support position, wherein the support panel extends substantially perpendicular to the backrest so as to form a supporting base for the backrest when the backrest is disposed in its folded-back position.

8. The cabin attendant seat according to claim 1, further comprising:
a further seat element which is movable relative to the backrest between a folded position, wherein a seat surface of the further seat element extends substantially parallel to and faces the rear surface of the backrest, and an unfolded position, wherein the seat surface of the further seat element extends substantially perpendicular to the rear surface of the backrest.

9. The cabin attendant seat according to claim 1, further comprising:
a second locking mechanism which is adapted to lock the cabin attendant seat in its operating position, and
an automatic activation device which is adapted to automatically activate the second locking mechanism when the cabin attendant seat is in use with the backrest being disposed in its upright position, and which is adapted to automatically release the second locking mechanism when the cabin attendant seat is not in use with the backrest being disposed in its upright position.

10. The cabin attendant seat according to claim 9, further comprising at least one of:
a first restraint system which is adapted to restrain a user using the cabin attendant seat with the backrest being disposed in its upright position, wherein the automatic activation device for automatically activating and releasing the second locking mechanism preferably is coupled to the first restraint system, and
a second restraint system which is adapted to be restrain a user using the cabin attendant seat with the backrest being disposed in its folded-back position.

11. An aircraft monument comprising,
a first wall,
a second wall extending substantially perpendicular to the first wall, and
a cabin attendant seat comprising:
a seat element, and
a backrest, said backrest being movable relative to the seat element between an upright position, wherein a backrest surface of the backrest extends at an angle of approximately 80 to 100° relative to a seat surface of the seat element, and a folded-back position, wherein the backrest surface of the backrest extends substantially co-planar with the seat surface of the seat element,
the cabin attendant seat being attached to the first wall of the aircraft monument, the cabin attendant seat further comprising:
a first pivoting mechanism allowing the cabin attendant seat to be pivoted between a stowed position and an operating position, wherein the cabin attendant seat is positionable relative to the first and the second wall into the stowed position by pivoting the seat element via the first pivoting mechanism such that the seat surface of the seat element faces the first wall of the aircraft monument and the backrest surface of the backrest faces the second wall of the aircraft monument, and wherein the cabin attendant seat is positionable relative to the first and second wall into the operating position by pivoting the seat element via the first pivoting mechanism such that the seat surface of the seat element extends substantially perpendicular to both the first and second wall, and the backrest surface of the backrest is in its upright position.

12. The aircraft monument according to claim 11, further comprising a stowage box which is fastened to the first wall of the aircraft monument in such a position that the seat element of the cabin attendant seat is supported by the stowage box when the cabin attendant seat is disposed in its operating position.

13. The aircraft monument according to claim 12, wherein a recess is formed in the first wall of the aircraft monument, the recess being adapted to at least partially receive at least one of the seat element of the cabin attendant seat when the cabin attendant seat is disposed in its stowed position and the stowage box fastened to the first wall of the aircraft monument.

14. The aircraft monument according to claim 11, further comprising at least one of:
- a medical panel comprising at least one medical outlet, the medical panel being attached to the first wall of the aircraft monument in such a position that the seat element of the cabin attendant seat extends below the medical panel when the cabin attendant seat is disposed in its operating position, and
- a curtain arrangement comprising a curtain rail which is fastenable to the first wall of the aircraft monument so as to extend substantially perpendicular to the first wall and a curtain which is fastenable to the curtain rail.

15. An aircraft monument comprising,
a first wall, and
a cabin attendant seat comprising:
a seat element, and
a backrest, said backrest being movable relative to the seat element between an upright position, wherein a backrest surface of the backrest extends at an angle of approximately 80 to 100° relative to a seat surface of the seat element, and a folded-back position, wherein the backrest surface of the backrest extends substantially co-planar with the seat surface of the seat element, the cabin attendant seat being attached to the first wall of the aircraft monument, further comprising:
a second wall extending substantially perpendicular to the first wall,
wherein the cabin attendant seat, in its stowed position, is positioned relative to the aircraft monument such that the seat surface of the seat element faces the first wall of the aircraft monument and the backrest surface of the backrest faces the second wall of the aircraft monument, and
wherein the cabin attendant seat, in its operating position, is positioned relative to the aircraft monument such that the seat surface of the seat element extends substantially perpendicular to both the first and the second wall of the aircraft monument, and the backrest surface of the backrest being disposed in its upright position extends substantially perpendicular to the first wall and substantially co-planar with the second wall of the aircraft monument.

\* \* \* \* \*